United States Patent

[11] 3,589,716

[72] Inventor Sherwin W. Footlik
 Chicago, Ill.
[21] Appl. No. 799,550
[22] Filed Feb. 12, 1969
[45] Patented June 29, 1971
[73] Assignee Reading Research Foundation, Inc.
 Chicago, Ill.

[54] BALANCE BEAM APPARATUS
 7 Claims, 5 Drawing Figs.
[52] U.S. Cl. ................................................. 272/60
[51] Int. Cl. ........................................... A63b 23/04
[50] Field of Search .......................... 272/1, 60, 62, 63

[56] References Cited
UNITED STATES PATENTS
3,083,964  4/1963  Wentzel ..................... 272/63

FOREIGN PATENTS
924,167  2/1955  Germany .................... 272/60

Primary Examiner—Richard C. Pinkham
Assistant Examiner—Richard Dror
Attorney—Alter, Weiss & Whitesel ABSTRACT: Apparatus used in treatment for dyslexia. The apparatus comprises balance beam facilities for use in performing balancing exercises requiring varying degrees of skill. The beam is wider on one side than the other, with opposing bevels effectively widening the wide side. Preferably, in one position, the beam wobbles slightly to make it more difficult to walk across it. The beam may be placed on a tilted standard for inclining the beam thereby increasing the degree of skill required.

PATENTED JUN 29 1971 3,589,716

INVENTOR
SHERWIN W. FOOTLIK
BY
*Alter and Weiss*
ATTORNEYS

BALANCE BEAM APPARATUS

This invention relates to apparatus used in perceptual motor training exercises, and more particularly, to balance beam apparatus used in the treatment of dyslexia.

A great many children with normal or higher than normal intelligence simply cannot learn to read adequately. It has been determined that most such children are victims of dyslexia, which is caused either by slight brain damage or inherited neurological handicaps. Dyslexia interferes with the victim's control over motor and sensory functions. It has been discovered that perceptual motor training can be used to overcome the effects of dyslexia. Perceptual motor training utilizes a systematic development program of exercises which improves the efficiency with which the human machine receives information, comprehends the information by associating it with past experiences, and then uses the information to control and guide a purposeful motor response. The training program is most beneficial when it forces the trainees to progress through a definite series of exercises which increasingly challenge the ability of the trainee.

The child undergoing training is taken through a series of exercises which progress in complexity. First, he is commanded to do a definite sample exercise until he responds to the command and properly follows the verbal orders given. As a second step, the child himself verbally issues the orders and progresses through the prescribed exercises. As a third step, the child progresses through the exercises without any orders. One of the series of exercises prescribed are balancing exercise wherein the child is trained to walk across a beam on a surface thin enough to require the utilization of the body's balancing facilities to successfully traverse the beam.

This invention is concerned with such a balance beam and it encompasses a single beam which can be used to provide a series of balancing exercises of varying degrees of complexity.

Thus, it is an object of this invention to provide a balance beam which can be used for a variety of balancing exercises of different complexities.

A more particular object of the present invention is to provide a balance beam and means for inclining the balance beam to vary the complexity of the balancing exercise using the beam.

A further object of the invention is to provide a balance beam having surfaces of different widths and shapes.

A preferred embodiment of the inventive balance beam apparatus comprises a beam having one side that presents a surface approximately twice as wide as the other side thereof. The wider side is beveled and the narrower side comprises a tenon which extends for the entire length of the beam.

The beam is provided with endpieces at each end thereof. The endpieces are preferably substantially flush with the top and bottom of the beam. The endpieces are connected to the beam in a manner that enables the beam to wobble during use.

These and other objects and features of the invention will now be explained in detail with the aid of the accompanying drawing wherein.

Figure 1:
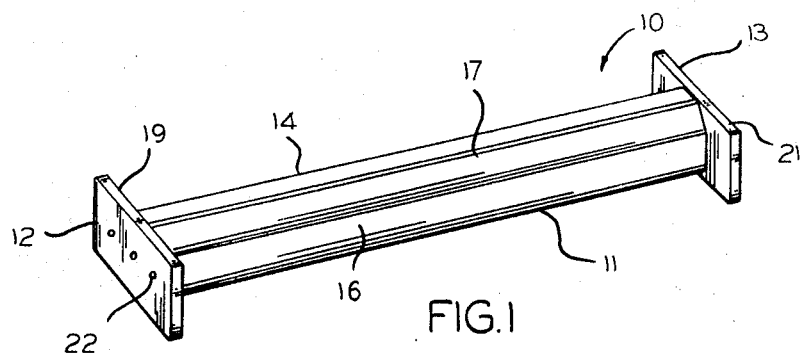
FIG. 1 is a pictorial view of the inventive balance beam.
Figure 2:
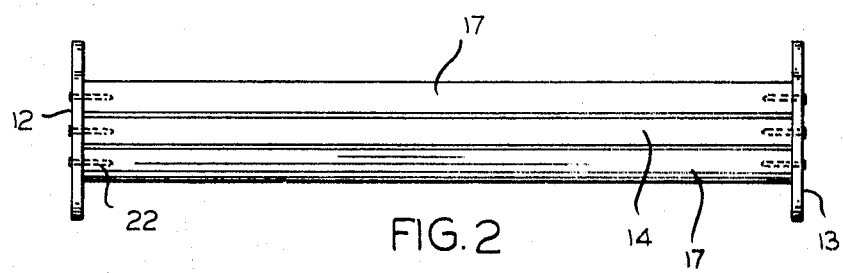
FIG. 2 is a top view of the inventive beam.

Referring now to the drawings, like characters of reference illustrate corresponding parts throughout. FIG. 1 pictorially shows a balance beam generally designated by numeral 10, for use with the balance beam apparatus. The balance beam comprises the beam body 11 having endpieces 12 and 13 secured to the ends thereof. As shown in FIG. 1, a first surface of the beam comprises a relatively wide, long horizontal section 14 leading to the vertical front faces, such as face 16 through beveled sections 17. The relatively wide horizontal surface enables a trainee using the balance beam to traverse the beam with a minimum of balancing skills, since the top surface is wide enough to present a comfortable surface for walking thereon. The beveled surfaces 17 enables the trainee traversing the beam to point his feet inwardly or outwardly so that while he is traversing the beam he effectively has an even wider surface to utilize. Therefore, even less skill is required to accomplish the feat without falling off the beam. Thus, the trainee either places his heels on flat surface 14 while his toes are on the beveled portion 17 or places his heels on the beveled portions 17 and places his toes on flat surface 14.

The student is allowed to so use the beveled portion until he can adroitly traverse the beam using his feet placed in a sidewise position. As his skill increases through the learning process, he is commanded to maintain his feet on the horizontal surface 14 and to keep his toes pointed straight ahead.

Figures 3, 4:
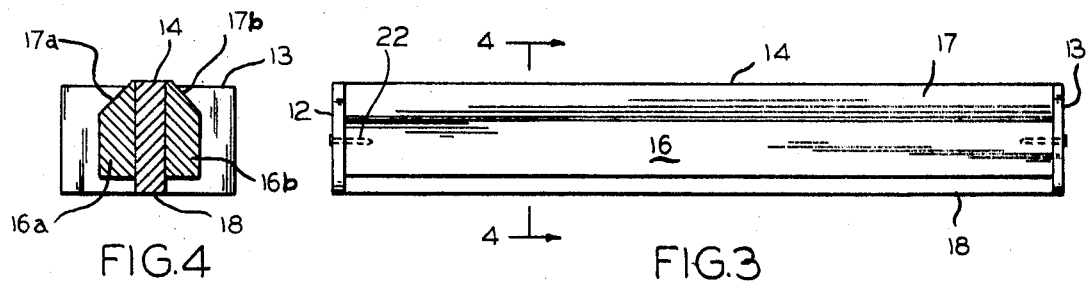
FIG. 3 is a front view of the inventive beam.
FIG. 4 is a cross-sectional view of the inventive beam taken at plane 4—4 looking in the direction of the arrows.

Means may be provided for increasing the difficulty of traversing the beam. More particularly, as best seen in FIG. 3 a tenon 18 extends the entire length of the beam. The beam thus is also used by placing it with the flat portion 14 and the tops 19 and 21 of the endpieces 12 and 13, respectively, contiguous to the floor. In this position, the surface presented for traversal is about half as wide as the surface presented when the beam is used beveled side up. Also adding to the complexity of the balancing by the user of the beam, is the fact that the tenon side of the beam is not beveled at all. Therefore, it is extremely difficult to curl one's feet around the horizontal surface presented to facilitate the balancing.

Adding further to the complexity of the balancing feat is the fact that as shown schematically in FIG. 3, the endpieces 12 and 13 are held in place by spikes such as spikes 22, rather than with screws. Thus, there is a certain amount of wobble and given between the main body of the beam itself and the endpieces, so that a perfectly stable piece is not presented to the user even when the beam is used with the flat surface 14 facing the floor. The effect of the wobble can be amplified if the width of the endpiece is made to be less than the width of the beam. Thus the bottom of the endpiece is slightly above the surface 14 when the surface 14 is down so that there can be greater give between the main body of the beam 11 and the endpieces 12 and 13.

Figure 5:
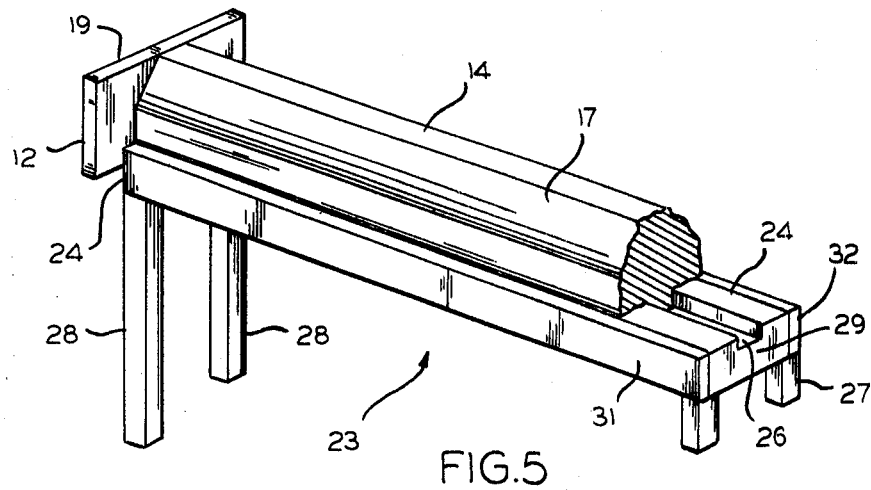
FIG. 5 is a pictorial view of the inventive beam used in conjunction with an inclined, mortised bed.

Means are provided for maintaining the beam in an inclined position, as shown in FIG. 5. A bed 23 comprising a flat portion shown as 24 has a mortise 26 extending the complete length of the bed. The beam is shown on top of the bed 23 broken off to better depict the shape of the bed itself. The bed is further shown as having legs comprising downwardly disposed standards. One pair of legs 27 shown at the right-hand side is much shorter than the other pair of legs 28 shown at the left-hand side of the bed. Thus, the bed is inclined and holds the beam in an inclined position. The tenon 18 of the beam fits into the mortise 26 to maintain the beam rigid and stable on the bed. The endpiece 12 which extends below the main body section 11 of the beam and serves to lock the beam in place and keep it from sliding downwardly on the downwardly biased bed. Thus, as shown, endpiece 12 is in contiguous relationship with the main bed section 24, and locks the beam in place.

The fit between the tenon and the mortise is such as to control the wobble and the stability of the beam and the bed. Thus, if a stable beam is desired, then the fit is close. Whereas, if an unstable beam is desired, then the fit is loose. In most cases, it has been found that the stable beam is adequate when the beam is inclined. The degree of difficulty in traversing the beam can again be varied by having the user perform different feats. Thus, the user can be commanded to turn around while on the beam which is more difficult; or, he can also be trained to traverse the beam walking backwards. As shown in FIG. 5, the bed itself, 24, comprises the mortise bed section 29 and sidepieces 31, 32 besides the legs.

As best shown in FIG. 4, the beam itself is made up of a pair of two-by-fours shown as 16a and 16b. The two-by-fours are shown with their shorter sides horizontal and the longer sides vertical. One side of the beam is beveled to form the beveled sections 17a and 17b. The two-by-fours sandwich a one-by-six which thus forms the tenon 18. Accordingly, the top surface 14 is made up of the one-by-six flush with the two-by-fours which are beveled so that the top section 14 is approximately twice the width of the bottom section 18 which is the narrower side of the one-by-six.

The endpieces may also be fabricated of one-by-sixes. Preferably, the walking surfaces are roughed.

If the endpieces 12, 13 are placed so that tenon 18 extends slightly below the endpieces, even more wobble occurs when the top surface of the tenon is contiguous to the ground surface or even when the surfaces 19, 21 are juxtaposed to the ground. When the top surface of the tenon 18 is against the ground, then it acts as a fulcrum around which the beam wobbles as the trainee traverses the beam.

In use, the balance beam apparatus is used first on the ground with the beveled end up. The trainee is verbally instructed to walk one length of the beam watching his feet and using his arms for balance. Then he verbalizes the instructions himself and repeats the traversal of one length. Finally, he repeats the traversal without verbalizing the instructions.

The next series of exercises comprise traversing the beam while keeping his eyes on a stationary target such as the instructors hand held at the trainees eye level. Another series of exercises comprises traversing the beam while the trainee keeps his eyes on a moving target, such as the instructor's hands, held at the trainees eye level, and moving back and forth. Yet another series of exercises comprise traversing the beam blindfolded or with eyes closed. Still another series comprises the backward traversal of the beam and turning on the beam while traversing it. Yet another series comprises assuming different balancing positions, such as squats and the like, during the traversal. All of the series of exercises are also performed both with the tenon uppermost and with the beam in the inclined bed.

Although I have shown a specific construction and arrangement of the parts and features, I am fully cognizant of the fact that many changes may be made without effecting the operativeness of the device and I reserve the rights to make such changes as I may deem necessary without departing from the spirit of my invention, or the scope of the claims.

Having thus described my invention, what I claim and desire to secure by Letters Patent in the United States, is:

1. Balance beam apparatus for use in accomplishing motor efficiency exercises,
    said beam comprising a main body section,
    said main body section having a relatively wide side requiring a first degree of skill when used for traversing the beam and a narrower side requiring a greater degree of skill when used for traversing the beam,
    holding means for selectively maintaining said main body section with either said wide side or said narrow side uppermost,
    wherein said holding means comprises endpieces transverse to the longitudinal axis of said main body section attached to each end of said main body section,
    said endpieces having at least two flat surfaces for supporting said main body section with either said wide or narrower side uppermost, and
    connecting means for connecting said endpieces to said main body section with at least one of said sides projecting beyond the endpiece to provide wobble as said balance beam apparatus is traversed.

2. Balance beam apparatus for use in accomplishing motor efficiency exercises,
    said beam comprising a main body section,
    said main body section having a relatively wide side requiring a first degree of skill when used for traversing the beam and a narrower side requiring a greater degree of skill when used for traversing the beam, and
    holding means for selectively maintaining said main body section with either said wide side or said narrow side uppermost,
    said wide side comprising a top flat surface and two side surfaces beveled from each longitudinal side of said top flat surface.

3. The balance beam apparatus of claim 2 wherein said narrower side comprise a tenonlike section extending the length of one side of said main body section.

4. The balance beam apparatus of claim 3 and biasing means for maintaining said main body section inclined to increase the degree of skill required in traversing said balance beam apparatus.

5. The balance beam apparatus of claim 4 wherein said biasing means comprises bed surface means,
    at least a first and a second vertical extending standard means for raising said bed surface means above ground level, and
    wherein said first vertical extending standard means is longer than said second vertical extending standard means.

6. The balance beam apparatus of claim 5 wherein said bed surface means includes a mortise groove extending the length of said bed surface means for receiving said tenonlike section.

7. The balance beam apparatus of claim 6 wherein locking means are provided for keeping said main body section from sliding on said inclined bed surface means, and wherein said locking means includes one of said endpieces.